J. SCHWARTZKOPF.
HARVESTER ATTACHMENT.
APPLICATION FILED MAY 15, 1918.

1,339,627.

Patented May 11, 1920.
2 SHEETS—SHEET 1.

Inventor
Jacob Schwartzkopf

Witnesses

By Victor J. Evans
Attorney

J. SCHWARTZKOPF.
HARVESTER ATTACHMENT.
APPLICATION FILED MAY 15, 1918.
1,339,627.
Patented May 11, 1920.
2 SHEETS—SHEET 2.
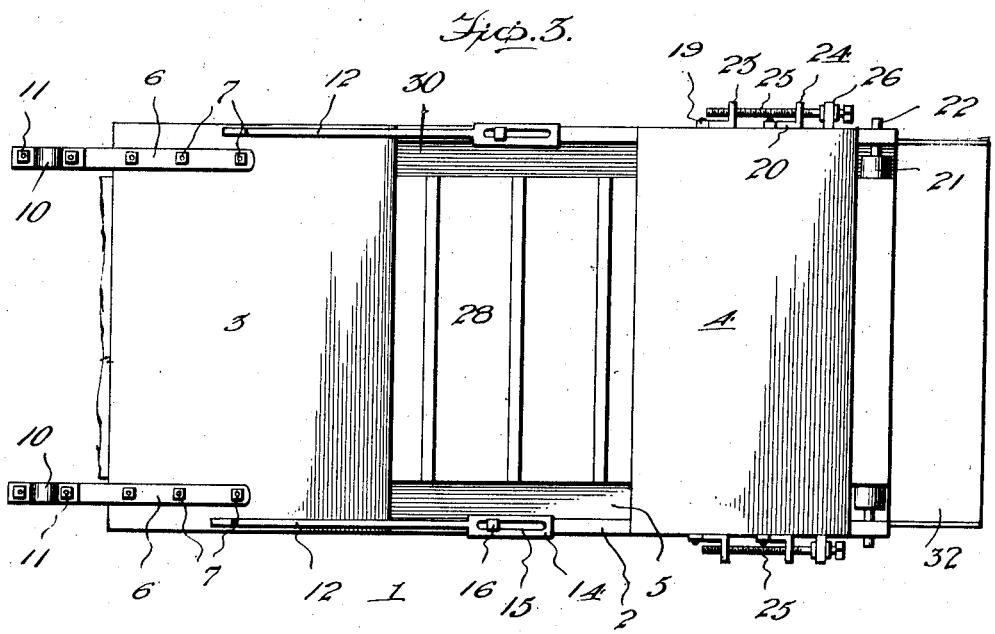
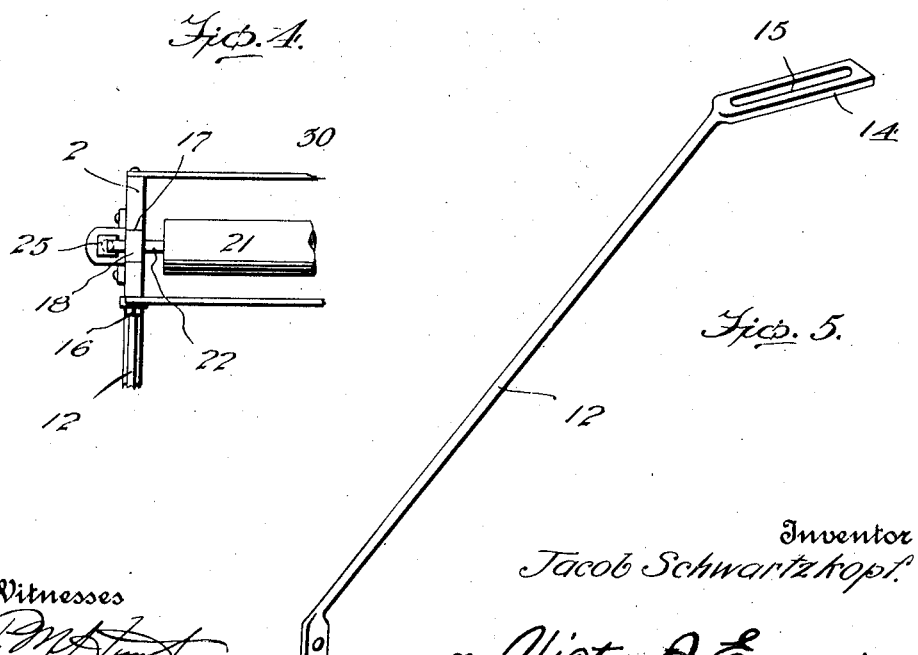
Inventor
Jacob Schwartzkopf.
Witnesses
By Victor J. Evans
Attorney

UNITED STATES PATENT OFFICE.

JACOB SCHWARTZKOPF, OF HAILEY, WYOMING.

HARVESTER ATTACHMENT.

1,339,627.  Specification of Letters Patent.  Patented May 11, 1920.

Application filed May 15, 1918. Serial No. 234,700.

*To all whom it may concern:*

Be it known that I, JACOB SCHWARTZKOPF, a citizen of the United States, residing at Hailey, in the county of Fremont and State of Wyoming, have invented new and useful Improvements in Harvester Attachments, of which the following is a specification.

This invention is an improved harvester attachment, to be used on a harvesting machine instead of the binding mechanism to enable the harvester to be used for harvesting short grain which can not be bound and to deliver the short grain into a wagon driven alongside the harvester, the object of the invention being to provide an improved attachment of this kind which is simple in construction, which can be readily attached to a harvester and which operates efficiently.

The invention consists in the construction, combination and arrangement of devices hereinafter described and claimed.

In the accompanying drawings:—

Fig. 3 is a plan of the same.

Figs. 4 and 5 are detailed views.

Figure 1:
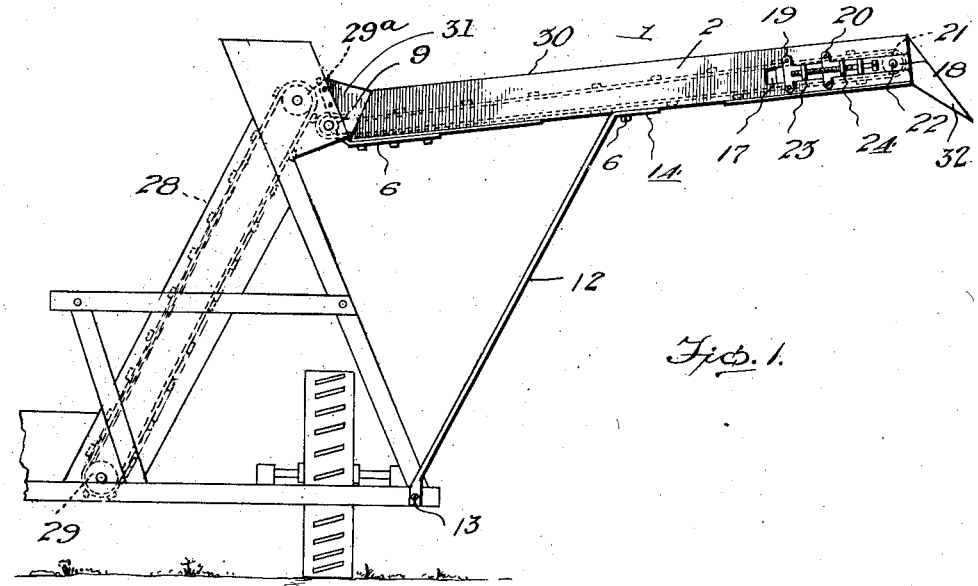
Figure 1 is a rear elevation of a portion of a harvesting machine with the binding attachment removed and my improved short grain loading attachment installed in place of the binding mechanism.
Figure 2:
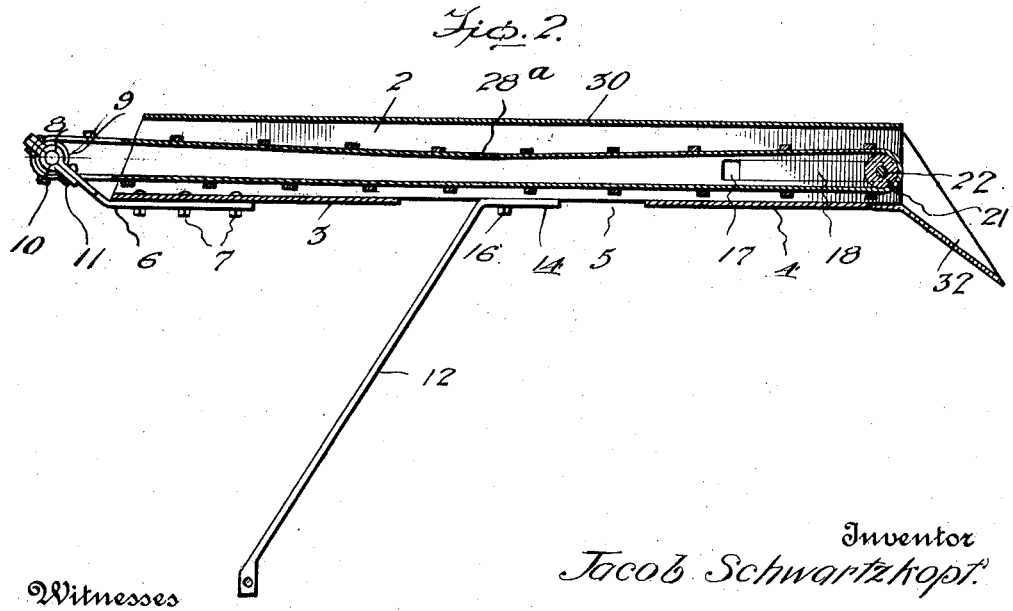
Fig. 2 is a longitudinal sectional view of my attachment.

In accordance with my invention I provide a frame 1 which comprises a pair of parallel side walls or members 2, and bottom members 3, 4 which are secured to the under sides of the side members, at points near the ends of the frame and which are spaced apart so that an opening 5 is formed between the said bottom members. To the lower side of the frame at the inner end thereof are secured hangers 6 by means of bolts 7. Said hangers project from the inner end of the frame and are provided at their projecting ends with bearings 8 which are adapted to be engaged on the end portions of the shaft of the usual upper elevator roller 9 of the harvesting machine, each bearing including a removable member 10 which is secured in place by bolts 11. The frame may be thus arranged to bear at its inner end against the elevator frame of the harvesting machine so that the said frame 1 may be arranged to extend from one side of the harvesting machine. To support the frame 1 at the required angle I provide brace irons 12 each of which is bolted at the lower end as at 13 to the elevator frame and has its upper end provided with an arm 14 arranged at an angle thereto, the said arm bearing against the under side of one of the side members 2 of the frame and being provided with a longitudinal slot 15. A bolt 16 secures each brace iron to the frame 1, the said bolts 16 extending through the slots 15 and said slots permitting vertical angular adjustment of the frame 1 so that said frame can be arranged at any desired inclination. Each side member 2 of the frame is provided with a longitudinal slot 17 at its outer end. Adjusting bearings 18 are arranged in said slots and are held in place by guide plates 19, which extend across the slots and said bearings and are secured on the outer sides of the side members 2 of the frame. A roller 21 has its shaft 22 mounted in said bearings, the roller being thereby arranged at the outer end of the frame 1 and for adjustment toward and from the outer end. The plates 19, 20 are respectively provided with outwardly turned arms 23, 24. Adjusting screws 25 for adjusting the roller 21 are swivelly connected to the arms 24 as at 26 and have threaded engagement in openings with which the arms 23 are provided.

An endless elevator apron 28, which is made of canvas or other like material, connects the lower roller 29 and the upper roller 29ª. An endless conveying apron 28ª connects the roller 21 and the roller 9. The elevator and conveyer coact to elevate the short grain out of the machine and carry the short grain outwardly and drop the same in a wagon driven along-side of the harvester. The frame 1 is covered as at 30 with suitable material such as sheet metal to prevent the grain on the elevator and carrier from being blown off or distributed by the wind. By adjusting the roller 21, which may be effected by appropriately turning the adjusting screws 25, the elevator and conveyer apron 28 may be kept at any requisite tension.

While I have herein shown and described a preferred form of my invention, I would have it understood that changes may be made in the form, proportion and construction of the several parts without departing from the spirit of my invention and within the scope of the appended claim.

Having thus described my invention, I claim:—

The combination of the elevator frame of a harvester, an elevator therein, a short grain harvester attachment comprising a frame spout extending laterally outward from the upper portion of said elevator frame and that is open at its ends and is entirely closed at its top and is provided in its bottom wall with an intermediate opening, the inner end of said spout arranged to receive short grain from the upper portion of the elevator, hangers at the inner end of the frame comprising members permanently connected to the frame and members detachably connected to the first-named members; said members receiving between them the upper roller shaft of the harvester elevator, means connected to the frame spout and supporting the same from said frame, and an endless apron mounted in the frame spout and extending longitudinally thereof.

In testimony whereof I affix my signature.

JACOB SCHWARTZKOPF.